United States Patent [19]

Breuner

[11] 4,010,919
[45] *Mar. 8, 1977

[54] AUTOGYRO HAVING BLADE TIP JETS

[76] Inventor: Gerald L. Breuner, 124 Lexford Road, Piedmont, Calif. 94611

[*] Notice: The portion of the term of this patent subsequent to Mar. 11, 1992, has been disclaimed.

[22] Filed: Dec. 5, 1975

[21] Appl. No.: 637,878

[52] U.S. Cl. .................. 244/17.21; 416/22
[51] Int. Cl.² ......................... B64C 27/02
[58] Field of Search ......... 244/17.21, 17.19, 17.11, 244/6, 7 R, 7 A; 416/170, 20, 21, 22; 115/42

[56] References Cited
UNITED STATES PATENTS

| | | | |
|---|---|---|---|
| 2,027,592 | 1/1936 | Hoffman et al. | 416/170 X |
| 2,965,178 | 12/1960 | Peterson | 416/22 |
| 3,225,537 | 12/1965 | Parsons | 115/42 X |
| 3,699,771 | 10/1972 | Chelminski | 416/22 |
| 3,720,060 | 3/1973 | Davies et al. | 416/170 |
| 3,870,251 | 3/1975 | Breuner | 244/17.21 |

Primary Examiner—Trygve M. Blix
Assistant Examiner—Barry L. Kelmachter

[57] ABSTRACT

This invention relates to an improved design for autogyros. It involves a more desirable layout of cockpit/engine placement than heretofore thought of. It provides for improved efficiency, visibility and balance and solves some of the problems of recent autogyros. Further, it provides for an improved and simplified rotor spin up mechanism.

4 Claims, 3 Drawing Figures

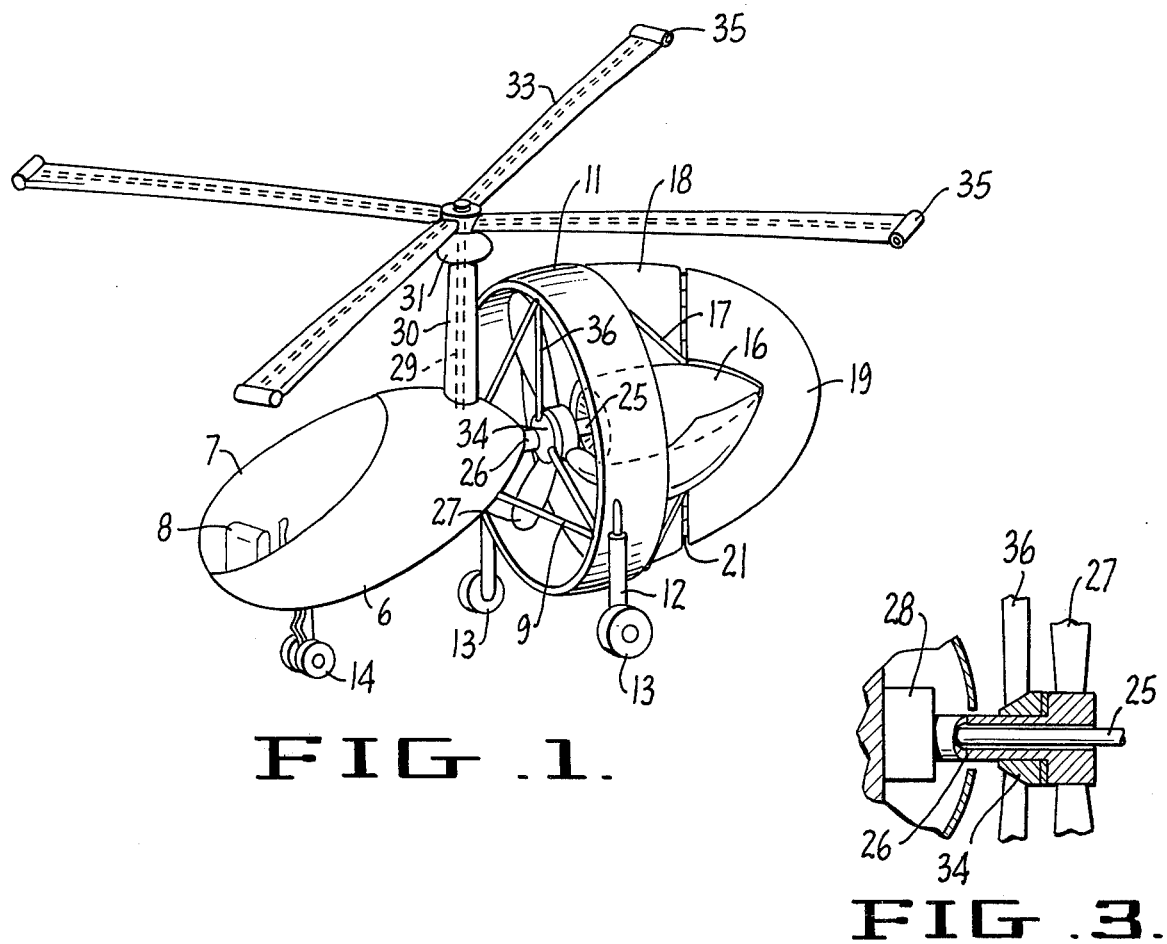
FIG. 1.
FIG. 3.
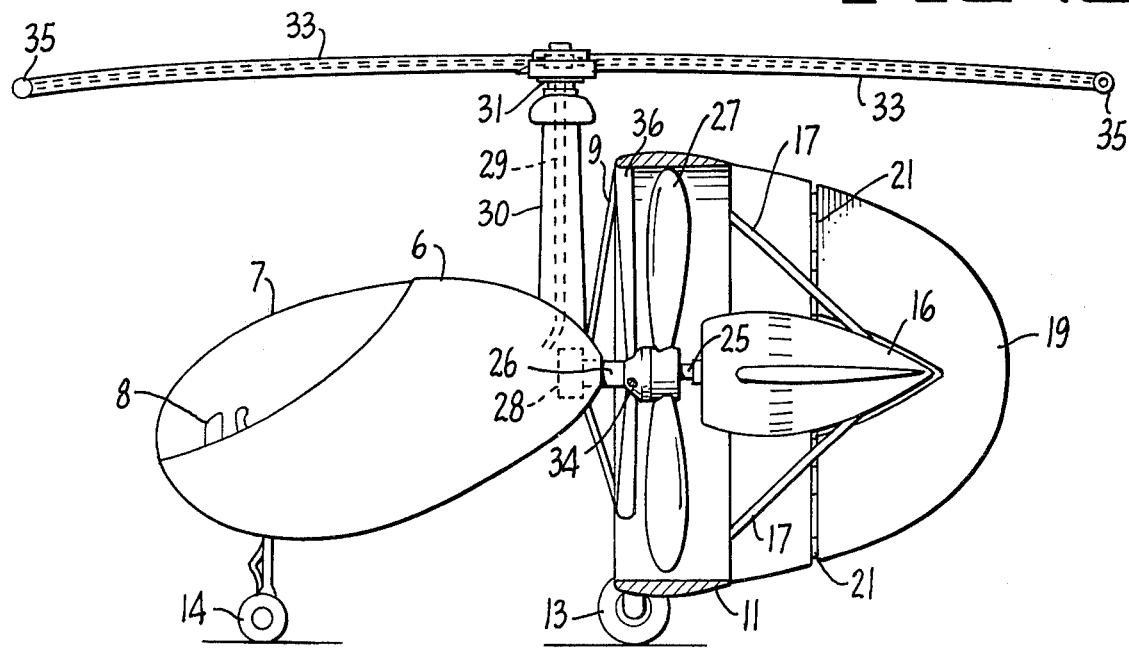
FIG. 2.

AUTOGYRO HAVING BLADE TIP JETS

This application is a variation and further improvement of my issued U.S. Pat. No. 3,870,251 dated Mar. 11, 1975.

BACKGROUND OF THE INVENTION

Autogyros have been known since 1923; however, one has not yet been produced that reaches the full potential of the machine. This invention is a move in the direction of extracting the full potential of such an aircraft. Speed, simplicity, reliability, controllability, weight reduction, balance, engine cooling, lowered center of gravity, and visibility are objects of this invention.

SUMMARY OF THE INVENTION

The design layout proposed by this invention seems, at first glance, similar to other autogyros of recent manufacture, such as the Air and Space, the Avian, and the McCulloch in that the pilot and passenger cabin is forward for visibility and the engine is to the rear of the pylon. This invention is similar to that extent but has important unique differences beyond the two points mentioned. The cabin remains forward for visibility. This is especially important during landing as the autogyro lands at a high angle of attack such that visibility during landing of the old type tractor autogyro was less than desirable. The engine in the present invention is installed in the rear, but as a tractor rather than a pusher as in the aforementioned autogyros. The location of the engine behind the pylon remains the same, the direction of engine thrust is changed from pusher to puller by mounting the engine 180° to the placement used in the previously mentioned autogyros.

This placement has several very important advantages. First, the engine can be closely cowled and still have adequate cooling as the engine is in the slipstream of the propeller. This has been a problem in this type of slow moving aircraft where a pusher installation has been used. Previous solutions have resulted in augmentors and reduction in streamlining. Another advantage to a forward facing rear mounted engine is engine noise reduction in the cabin. The engine is farther removed from the cabin and the noise is further carried away in the propeller slipstream. Also the exhaust is not directed at the propeller which causes noise. A further advantage is the reduction of fire hazard from an engine mounted in the rear. A further advantage is that the propeller remains closer to the pylon where the height profile under the rotor is at its greatest, as the possible height and length profile of the fixed structure to the rear of the autogyro pylon is limited by operational necessity. Having the propeller ahead of the engine and closely behind the pylon allows more latitude in engine placement for balance of the cabin area. It also allows for greater area behind the propeller for vertical stabilizers. It also allows for a lower mounted engine and propeller as the propeller is over the main landing gear. The necessary structure required to connect the cabin, rotor, landing gear, engine and stabilizers can incorporate a duct for the propeller for more efficient thrust. Mounting tip jets for spin up of the rotor blades eliminates the need of transmission, power shaft and clutch. Tip jets also provide a secondary source of power for greater flexibility and reliability.

BRIEF DESCRIPTION OF THE DRAWING

FIG. 1 is a perspective view of an autogyro embodying the present invention.

FIG. 2 is a side elevation, partly in section, of the preferred design layout of the autogyro.

FIG. 3 is a fragmentary view, partly in section showing the relation between the drive shaft 25 to the bearing block means 28 and the concentric annular shaft 26 surrounding the shaft 25 for rotating the propeller 27.

DESCRIPTION OF THE PREFERRED EMBODIMENT

The autogyro includes a cabin, generally indicated at 6, having a windshield 7 at its forward end. Controls 8 are provided in the cabin. Attached to the cabin by struts 9 is an annular duct 11 supported while on the ground on a framework, generally indicated at 12, the latter having landing wheels 13. Forward landing wheels 14 are provided beneath the cabin to provide three point suspension for the autogyro. An engine 16 is supported by struts 17 from the duct 11. Also supported from the duct and extending vertically is stabilizer fin 18 upon which a rudder 19 is mounted by means of hinge 21, the rudder being moved by suitable controls in the cabin 6 to alter the direction of forward motion of the autogyro. Shaft 25 extends forwardly from the engine 16 to a bearing block and spline means 28 and transmits to the hollow shaft 26, concentric with shaft 25, which extends rearwardly from the bearing block means 28 and carries the multibladed propeller 27 which rotates in the duct 11. The shaft 26 is supported in bearing hub 34 centrally of duct 11 by struts 36 from the duct 11.

Fuel line 29 runs through rotor support tube 30 on which turns rotor hub 31. Fuel is directed through hub 31 and blades 33 to tip jets 35 which, when burning, turn the rotor.

By way of example, but not by way of limitation, the block and spline means 28 can be similar to that disclosed in U.S. Pat. No. 3,225,537, and the tip jets 35 can be similar to those disclosed in U.S. Pat. No. 3,093,962.

From the foregoing, I believe it will be apparent that the numerous advantages I have heretofore pointed out are inherent in the construction which I have disclosed.

I claim:

1. An autogyro comprising a cabin,
   a tubular duct supported on the cabin rearwardly thereof and in spaced relation thereto,
   an engine supported within the duct in substantial axial alignment therewith and spaced from the cabin,
   a propeller located between the engine and the cabin,
   a rotatable first shaft extending forwardly from the engine and driven by the engine,
   bearing and spline means connected to the first shaft forwardly of the propeller,
   a tubular shaft concentric with the first shaft and rotatable by the first shaft,
   the propeller fixed on the tubular shaft for rotation therewith within the duct and between the engine and cabin,
   upright rotor support tube means supported on the cabin,
   rotor blade means fixed on the rotor hub to rotate on the rotor support tube,
   and rotor blade tip jets providing rotation thereof.

2. An autogyro as in claim 1, wherein the duct comprises an annular, cylindrical ring, strut means connected with the cabin and with the duct, other strut means connected with the duct and with the engine and supporting the engine substantially rearwardly of the duct, and stabilizer and rudder means supported on the duct rearwardly thereof.

3. An autogyro as in claim 2, wherein said engine provides the aircraft thrust and said tip jets provide rotational power for said rotor blade means, for improving efficiency, reliability, controllability, visibility and balance of the autogyro.

4. An autogyro having a rotor comprising:
 a cabin;
 duct defining means defining an essentially circular duct connected to said cabin;
 an autogyro engine connected to said duct defining means;
 a propeller mounted in said duct defining means;
 propeller driving means connecting said propeller to said engine and including a first shaft connected at one end to said engine, a bearing block support connected to the other end of said first shaft for supporting said first shaft, a hollow shaft surrounding said first shaft to be essentially coaxial therewith and connected at one end thereof to said first shaft for rotation therewith, and a propeller mounting means connected to said hollow shaft for rotation therewith so that said propeller is driven by said engine via said shafts and propeller mounting means; and
 rotor blade tip jets on the rotor for causing rotation thereof so that the rotor is rotated by said tip jets.

* * * * *